United States Patent [19]
John, Jr.

[11] Patent Number: 5,191,185
[45] Date of Patent: Mar. 2, 1993

[54] GIRTH AND SEAL WELDING APPARATUS

[75] Inventor: Clarence D. John, Jr., Penn Hills Township, Pa.

[73] Assignee: Westinghouse Electric Corp., Pittsburgh, Pa.

[21] Appl. No.: 605,882

[22] Filed: Oct. 30, 1990

[51] Int. Cl.⁵ .................................................. B23K 9/12
[52] U.S. Cl. ................................ 219/60 R; 219/124.02
[58] Field of Search ............ 219/60 R, 61, 136, 124.02

[56] References Cited

U.S. PATENT DOCUMENTS

| | | |
|---|---|---|
| 3,629,542 | 12/1971 | Warner . |
| 3,725,635 | 4/1973 | Fink et al. . |
| 4,003,788 | 1/1977 | Boyko et al. ............... 219/60 R |
| 4,188,521 | 2/1980 | Yeo . |
| 4,480,171 | 10/1984 | Christiansen et al. . |
| 4,570,051 | 2/1986 | Miwa . |
| 4,837,419 | 6/1989 | Boatwright et al. . |
| 4,857,691 | 8/1989 | Boatwright . |
| 4,971,750 | 11/1990 | Duncan et al. ............... 219/60 R |

Primary Examiner—Clifford C. Shaw

[57] ABSTRACT

A welding apparatus is disclosed for seal welding closed the bore of a sealing plug which is positioned adjacent the end of a hollow tube and where the bore defines an axis in communication with the tube. The apparatus includes a head with an end stop member rotatably mounted thereto. The end stop member is movable between an extended position where the front sealing plug engaging end is extended for engaging and supporting a sealing plug during girth welding, and a retracted position where the end stop member is retracted. A seal welding electrode is supported in an axial passage of the end stop member and is movable therein between a retracted non-welding position and an extended seal welding position where the electrode tip extends outward beyond the front opening of the end stop member for permitting the seal welding closure of the sealing plug axial bore. Drive means is interconnected to the seal welding electrode and end stop member for 1) moving the end stop member to a retracted position while moving the seal welding electrode to an extended welding position and for 2) moving the end stop member to an extended position while moving the seal welding electrode to a retracted non-welding position.

29 Claims, 6 Drawing Sheets

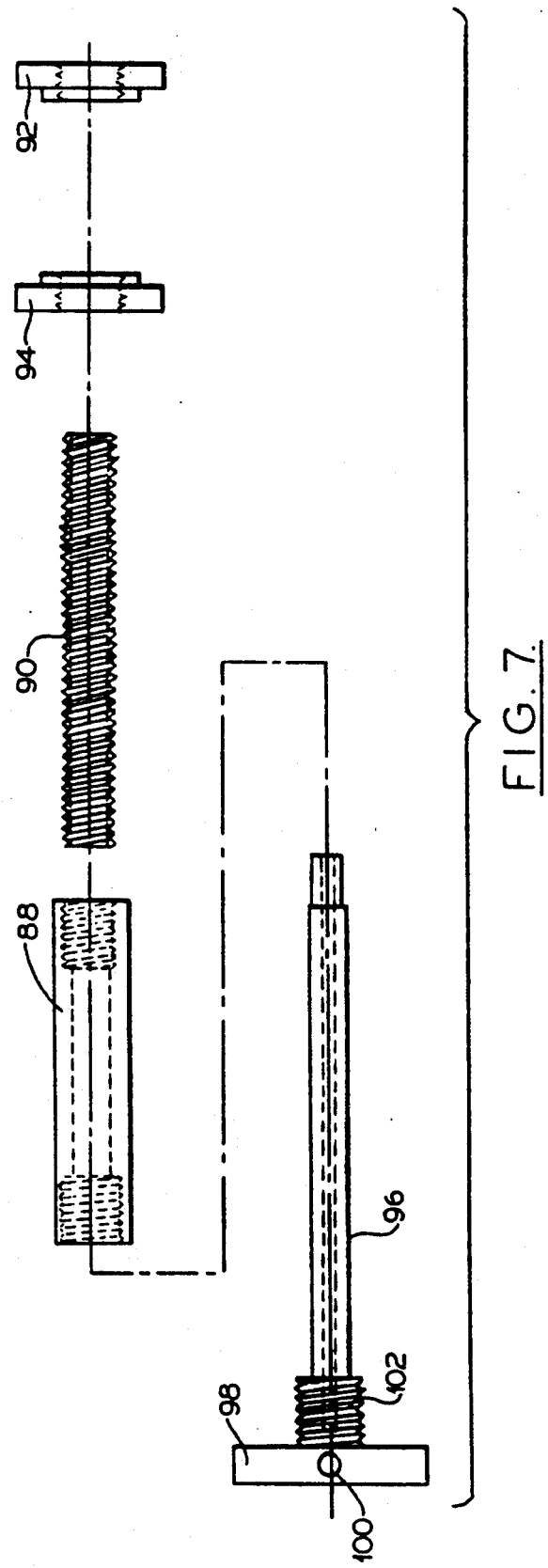

GIRTH AND SEAL WELDING APPARATUS

FIELD OF THE INVENTION

This invention relates to a welding apparatus for girth welding a sealing plug which is positioned adjacent the end of a hollow tube and where the bore is in communication with the tube.

BACKGROUND OF THE INVENTION

In the manufacture of nuclear fuel rods, one end of a hollow tube cladding is closed with an end plug and nuclear fuel pellets are inserted into the open end. A sealing plug, or end plug as sometimes referred to in the industry, having an axial bore therethrough, is positioned adjacent the open end and girth welded to the hollow tube. The axial bore communicates with the passage of the tube. During girth welding, air and fumes are drawn from the tube through the axial bore. The tube then is pressurized with a nonoxidizing gas by passing the gas through the sealing plug axial bore. The sealing plug then is seal welded to close the axial bore.

These two welds, the seal and girth weld, typically have been performed at separate girth and seal welding stations. For example, U.S. Pat. No. 4,188,521 to Yeo, discloses a single station girth welding apparatus for girth welding a sealing plug to a nuclear fuel rod. After girth welding, subsequent seal welding of the axial bore is performed. However, for economy of space, increased weld quality, and reduced welding and tube transport time, girth and seal welding now have been performed in the same pressurization chamber. For example, in commonly assigned and allowed patent application Ser. No. 07/373,076 filed Jun. 29, 1989 by Robert Duncan, now U.S. Pat. No. 4,971,750, an end stop is adapted for engaging a sealing plug positioned in a fuel rod. The fuel rod is inserted into a girth and seal welding chamber. A welding electrode extends through an axial passage of the end stop for facilitating the seal welding closure of the sealing plug bore. An air channel extends between the axial passage and an outlet on the surface of the end stop and includes a one-way ball valve for permitting the free passage of gas from the tube, and through the end stop axial passage while precluding passage of gas in the reverse direction.

In this type of apparatus, the seal welding electrode tip can be damaged during multiple girth welding operations. During girth welding the tip of the welding electrode is disposed adjacent the axial bore of the sealing plug. Hot gases are drawn through the axial opening and engage the tip of the seal welding electrode fixed within the axial opening. These hot gases typically erode the electrode. As a result, production down time increases and production costs increase because the end stop and seal welding electrode must be changed. Also, the heat generated during seal welding can damage the end stop unless the end stop is moved out of engagement with the sealing plug during the seal welding operation.

SUMMARY OF THE INVENTION

It is therefore an object of this invention to provide a welding apparatus for seal welding closed the axial bore of a sealing plug which is positioned adjacent the end of a hollow tube and where the bore is in communication with the tube.

It is still another object of this invention to provide an apparatus for girth welding a sealing plug having an axial bore defined therethrough to the end of a hollow tube such as a nuclear fuel rod and where the bore is in communication with the tube, and for seal welding the bore of the sealing plug, and which overcomes the deficiencies of the prior art.

These and other objects and advantages of the invention are accomplished by the welding apparatus as will be described for seal welding closed the bore of a sealing plug which is positioned adjacent the end of a hollow tube such as a nuclear fuel rod, and where the bore is in communication with the tube. The apparatus includes a housing body and an end stop member having a front sealing plug engaging end and a rear end. An axial passage extends through the end stop member and forms a front opening in the front end. The end stop member is rotatably mounted to the housing body and is movable between a forward position where the front end is extended outward beyond the housing body for engaging and supporting a nuclear fuel rod sealing plug during girth welding, and a rearward position where the end stop member is retracted and where the front end is positioned rearward of the forward position.

A seal welding electrode having a forward arc discharge tip is positioned coaxially in the end stop member. The electrode is movable between a retracted non-welding position where the tip is positioned within the axial passage and an extended welding position where the tip extends outward beyond the front opening of the end stop member for permitting the seal welding closure of the axial bore of a fuel rod sealing plug.

A drive means interconnects the welding electrode and the end stop member for 1) moving the end stop member to a retracted position while displacing the welding electrode to an extended seal welding position, and 2) moving the end stop member to an extended girth welding position while displacing the welding electrode to a retracted non-welding position.

The drive means for moving the end stop member and the seal welding electrode includes a drive cylinder having a cylinder body slidably mounted on a frame and an output shaft with a forward end connected to the welding electrode. The cylinder body is connected to the rear portion of the end stop member. Adjustable stops interconnect the cylinder output shaft and engage the frame for moving the cylinder body in a direction opposite movement of the output shaft in response to movement of the output shaft whereby as the output shaft moves the welding electrode, the cylinder body and end stop is moved in an opposite direction.

BRIEF DESCRIPTION OF THE DRAWINGS

Some of the objects and advantages of the present invention having been stated, others will become apparent by reference to the following drawings in which:

FIG. 7 is an exploded view of the air cylinder output shaft and related components.

DETAILED DESCRIPTION OF THE PREFERRED EMBODIMENT

Figure 1:
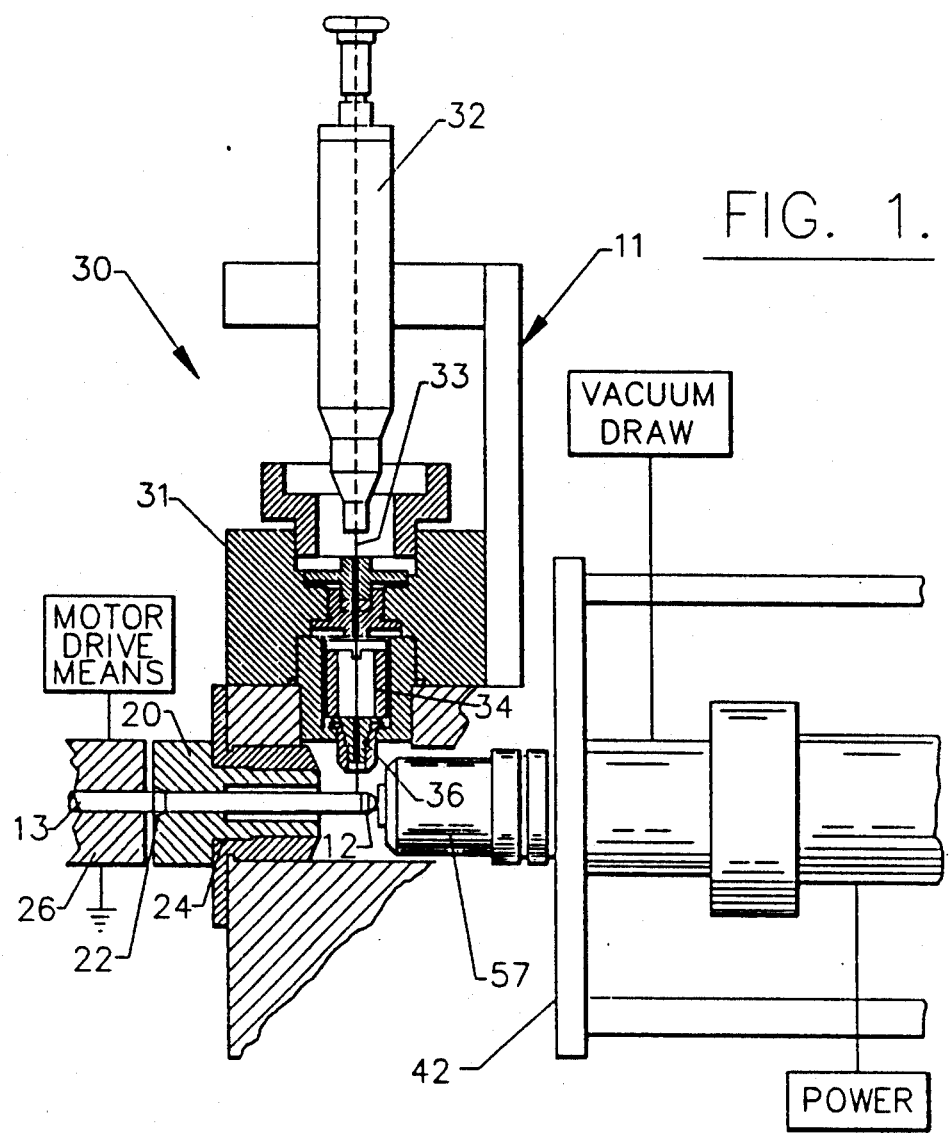
FIG. 1 is a diagrammatic partial, side sectional view of a welding chamber having the seal welding apparatus in accordance with the present invention mounted to the welding chamber.

Referring now to FIG. 1, there is illustrated a portion of the seal welding apparatus in accordance with the present invention, indicated generally at 10, mounted to a conventional girth welding chamber, indicated generally at 11, for girth welding the sealing plug 12 to the end of a hollow tube, i.e. a nuclear fuel rod 13.

Figure 1A:
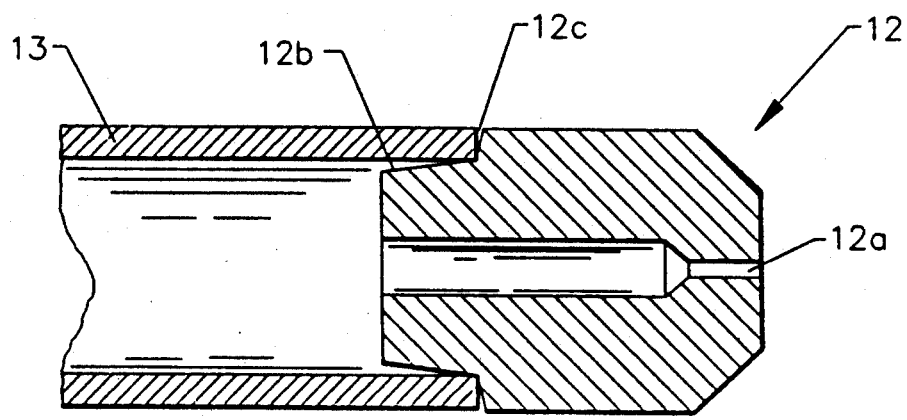
FIG. 1A is an enlarged view of one type of sealing plug positioned adjacent and into the end of a nuclear fuel rod and where the bore of the sealing plug communicates with the interior of the tube.

As shown in FIG. 1A, the sealing plug 12 includes an axial bore 12a extending therethrough. The sealing plug is coaxially aligned and positioned adjacent the end of the fuel rod 13 and so that the axial bore 12a communicates with the interior of the fuel rod. In the preferred embodiment, the sealing plug 12 includes a narrowed extension 12b dimensioned for insertion into the rod. A lip 12c acts a stop. Alternatively, the sealing plug 12 may not include the narrowed extension and will be positioned adjacent the rod and girth welded thereto by a butt joint. The sealing plug initially can be positioned adjacent the end by tack welds or other appropriate means.

The sealing plug 12 typically includes an axial bore 12a for allowing hot gases to be withdrawn therethrough during girth welding and for allowing pressurization of the fuel rod before seal welding.

Typically, the fuel rod is pressurized to 300 to 500 pounds per square inch of helium. After pressurization, the fuel rod sealing plug must be seal welded to close the bore and prevent the escape of the helium gas.

Figure 2:
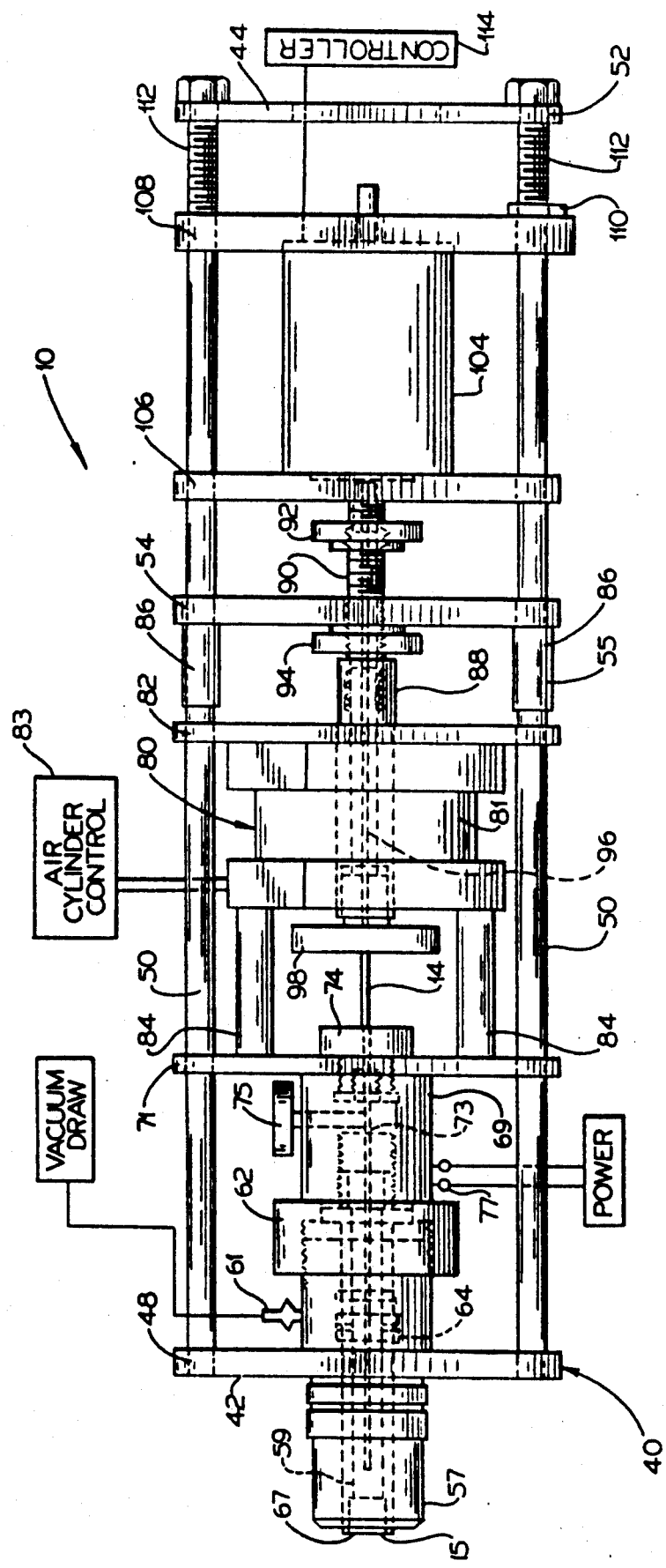
FIG. 2 is a top plan view of the welding apparatus in accordance with the present invention wherein the seal welding electrode is retracted and the end stop member is extended and showing by hidden lines various components of the air cylinder, welding electrode and end stop member.
Figure 3:
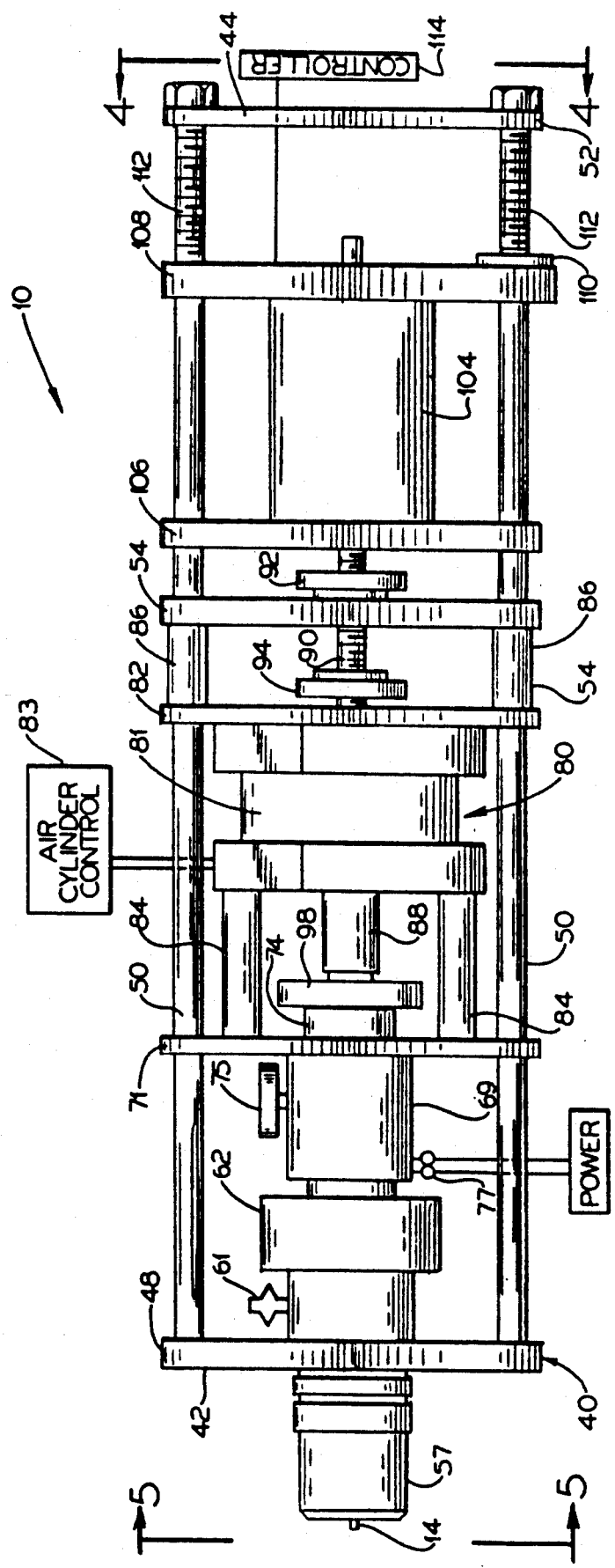
FIG. 3 is a plan view of the seal welding apparatus in accordance with the present invention where the seal welding electrode is extended and the end stop member is retracted.

The seal welding apparatus 10 includes a seal welding electrode 14 for seal welding closed the bore of the sealing plug 12 of the nuclear fuel rod 13, and end stop means in the form of an elongate end stop member 15 for engaging and supporting the sealing plug 12 during girth welding (FIGS. 2 and 3). During seal welding the end stop member 15 is moved out of engagement with the sealing plug and the seal welding electrode 14 is displaced forward into close proximity to the bore of the sealing plug 12. The retracted end stop member 15 is now less likely to erode during seal welding. During girth welding, the electrode 14 is withdrawn into an axial passage of the end stop member where it is protected from the immediate hot gases drawn through the axial bore 12a.

Although the welding apparatus as hereinafter described is applicable to seal welding any axial bore-bearing plug to the end of a hollow tube, the present invention will be described in reference to the welding operation performed on a sealing plug positioned adjacent the end of a nuclear fuel rod.

The girth welding chamber 11, includes a fuel rod receiving head 20 having an orifice 22 therethrough to receive a tubular nuclear fuel rod 13. The receiving head 20 is secured by a press fit into a welding chamber access opening 24. The fuel rod 13, held by a motor driven grounded chuck 26, is advanced through the receiving head 20 where the sealing plug 12 engages the end stop member 15 of the seal welding apparatus. The apparatus 10 is bolted to the welding chamber 11 by means of bolts and spacer bushings (not shown in detail).

The girth welding chamber 11 includes a conventional girth welding assembly indicated generally at 30, and is supported by a coupler 31 and extends radially into the welding chamber. The girth welding assembly 30 is a TIG welder and includes a power generator 32 having a nonconsumable tungsten girth welding electrode 33, and a welding nozzle 34 for mixing an inert gas with the arc produced by the power generator 32. As is conventional, the tungsten girth welding electrode 33 extends the length of the power generator 32 and includes an arc discharge tip at the electrode end and the electrode extends to a nozzle tip 36. Positioning clamp means in the nozzle 34 (not shown) clamps the girth welding electrode 33 in a set position relative to the nozzle. As is conventional with tungsten inert gas arc welding, an arc is generated between the tungsten girth welding electrode 33 and the joint to be formed. The preferred inert gas is helium and is provided into the welding chamber by a gas source (not shown). The inert gas contained in the girth welding chamber 11 surrounds the generated arc and tungsten girth welding electrode 33 and prevents the decomposition of the tungsten during girth welding.

Figure 4:
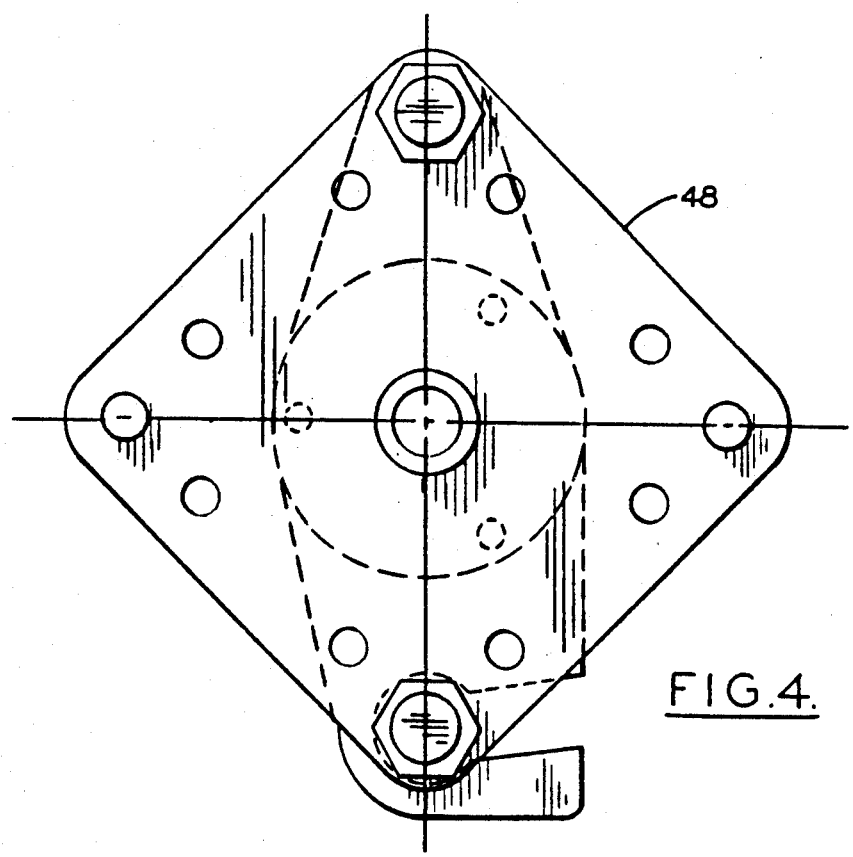
FIG. 4 is an end view of the welding apparatus taken along line 4—4 of FIG. 3.
Figure 5:
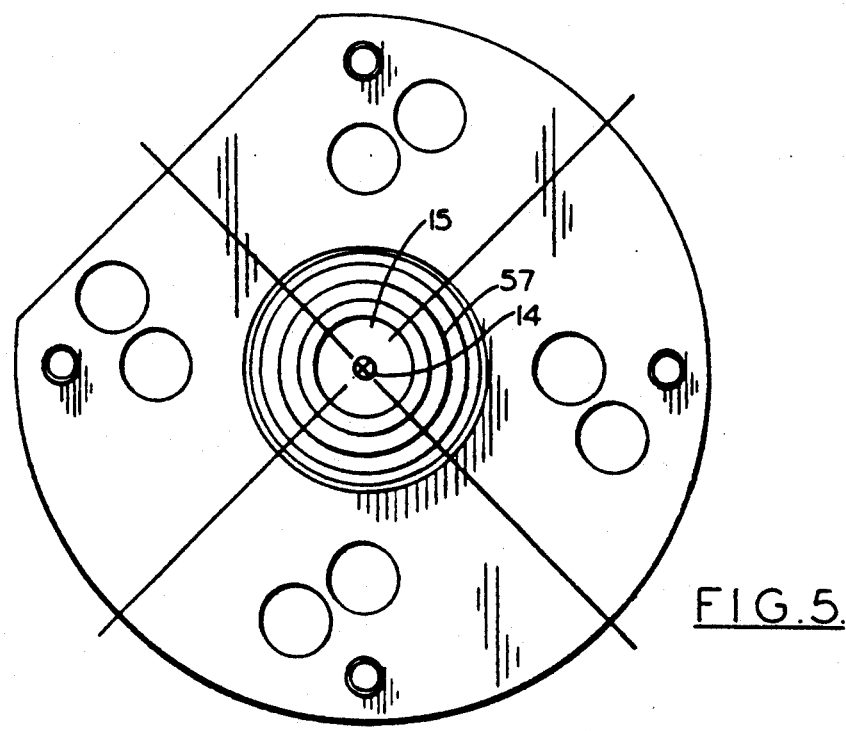
FIG. 5 is a front view of the welding apparatus taken along line 5—5 of FIG. 3.
Figure 6:
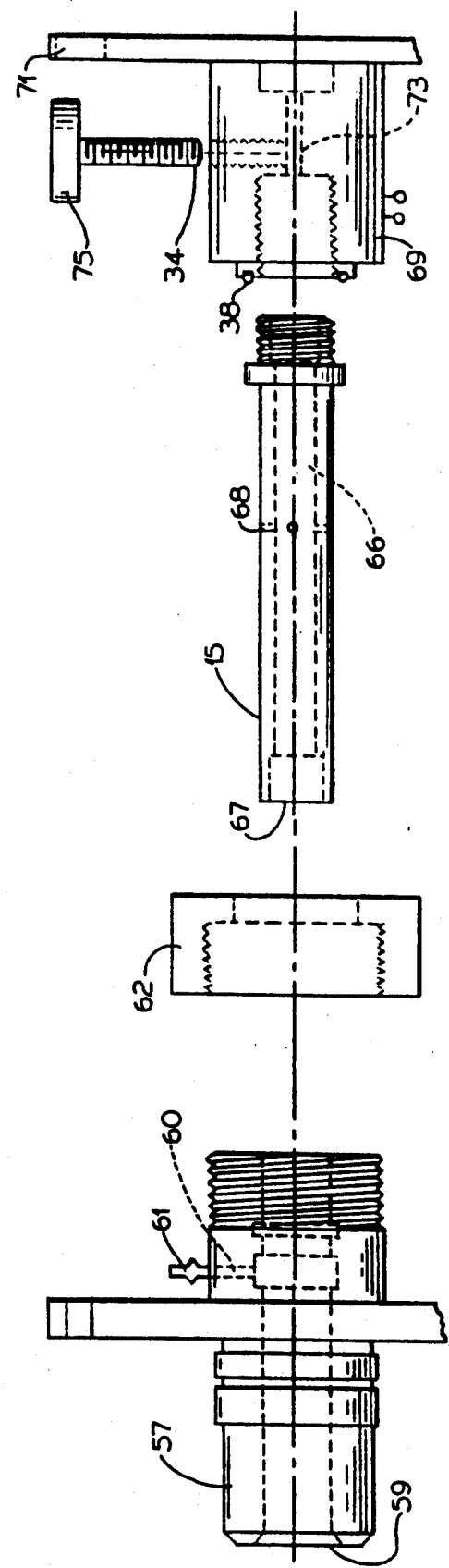
FIG. 6 is an exploded view of the housing body, end stop member and related components.

Referring now to FIGS. 2 and 3, plan views of the welding apparatus 10 are illustrated and show in detail various components of the welding apparatus. The welding apparatus 10 includes a frame indicated generally at 40, defining respective forward and rear ends 42, 44. The forward end 42 is disposed within a circular opening 46 of the girth welding chamber 11 as illustrated in FIG. 1. The front end 42 the frame 40 includes a circular configured front flange support member 48 (FIG. 5) which is fixed to the girth welding chamber by means of bolts and spacer bushings. The frame 40 also includes a pair of substantially parallel guide rails 50 extending longitudinally from the forward 42 to the rear end 44 of the frame 40. The guide rails 50 are tubular in construction and fixed to the front support member 48. A rectangular rear flange support member 52 (FIG. 4) supports in spaced parallel relation the rear portion of the guide rails 50. A fixed frame plate 54 extends transverse to the guide rails 50 along a medial portion of the frame 40 and is fixed to the guide rails 50. The front flange support member 48 includes an opening in a medial portion thereof through which a main head 57 extends and is mounted thereto. The head 57 includes a front end extending outward beyond the front flange support member 48 and a threaded rear portion (FIG. 6). The front portion of the head extends into the girth welding chamber where it is sealed thereto (FIG. 1), by means such as a conventional seal. An axial opening 59 extends through the head 57 from the front to the rear end. A gas passageway 60 extends from the outer surface of the head 57 and communicates with the opening (FIG. 6). Means, such as an air nozzle 61, is positioned on the outer surface and connects the gas passageway 60 to a suitable vacuum source. A cylindrical stop limiter 62 having an opening therethrough with internal threads is threadably mounted on the rear portion of the main head 57.

As illustrated in FIG. 2, the end stop member 15 extends through the main head 57 and is slidably and rotatably mounted therein by a bearing assembly 64. The rear portion of the end stop is threaded. The end stop member 15 includes an axial passage 66 extending therethrough and forming a front opening 67 which is configured for engaging the sealing plug of a nuclear fuel rod. At least one gas passage 68 extends from the outer surface of the end stop 15 to the axial passage 66 (FIG. 6). Gases in the axial passage 66 are drawn through the gas passage 63 into the opening 59 of the head 57 and into the gas passageway 60.

An electrode seal housing 69, formed of a conductive material such as brass, is threadably mounted on the rear portion of the end stop 15. The brass electrode seal housing 69 has a front portion larger than the opening of the rear portion of the stop limiter 62 to prevent entry of the seal housing 69 into the stop limiter opening (FIG. 6). A running flange guide 71 is fixed to the rear portion of the electrode seal housing 69 and is slidably mounted to the guide rails 50 as illustrated in FIGS. 2 and 3. By threadably adjusting the stop limiter 62 on the head 57 the range of forward movement of the end stop member 15 and the electrode seal housing 69 is adjustable. The extent to which the front sealing plug engaging end of the end stop member 15 extends outward beyond the head opening 59 is determined by the position of the stop limiter 62 on the head 57. The range of the most extended position of the end stop member 15 can be adjusted by rotating the stop limiter 62 on the head 57. This acts as a finite adjustment for the range of movement.

As illustrated in FIGS. 2 and 6, the electrode seal housing 69 includes a passageway 73 extending in axial alignment with the axial passage of the end stop member 15. The front portion of the passageway 73 is counter bored and threaded to receive the threaded end of the end stop member 15. The rear portion is counter bored and threaded to receive therein a threaded stop 74 (FIGS. 2 and 3). The passageway 73 is dimensioned to receive therein the seal welding electrode 14. The seal welding electrode 14 extends through the passage 66, 73 defined by the end stop member 15 and electrode seal housing 69. An electrode clamp screw 75 is mounted on the outer surface of the electrode seal housing 69 and extends into the housing and transverse to the passage 73. The bottom portion of the screw engages the electrode 14 for sliding engagement therewith. Means such as electrical connectors 77, are mounted on the outer surface of the electrode seal housing 69 to permit connection of the housing to a source of electrical current for providing an electric potential to the brass housing. The electrode clamp screw imparts pressure onto the welding electrode 14 of sufficient pressure for ensuring contact of the welding electrode with the brass housing 69 while allowing frictional sliding of the welding electrode 14 therethrough so that an electrical current applied to the housing 69 is transmitted to the welding electrode 14. An electrode seal (not shown in detail) is included for preventing gases flowing from the end stop passage 66 into the housing passage 73.

Drive means in the form of a drive cylinder, indicated generally at 80 in FIGS. 2 and 3, is interconnected to the seal welding electrode 14 and the end stop member 15 for 1) displacing the end stop member to a retracted nonwelding position while also moving the seal welding electrode 14 to an extended seal welding position and 2) moving the end stop member 15 to an extended girth welding position while displacing the seal welding electrode to a retracted nonwelding position. The drive cylinder 80 preferably is an air cylinder and includes an air cylinder body 81. It is fixed to an air cylinder guide plate 82 which, in turn, is slidably mounted on the guide rails 50. Two spacer mounts 84 interconnect the forward portion of the air cylinder 80 and the electrode seal housing running flange guide 71. As the air cylinder 80 is moved along the guide rails 50, the electrode seal housing 69 and end stop member 15 connected therewith also move. Complete forward movement of the air cylinder 80 is limited by the extent the electrode seal housing 69 can move until it engages the stop limiter 62. Rearward movement of the air cylinder is limited by stop limit bushings 86 positioned on each guide rail 50 and fixed to the frame plate 54. Actuation of the air cylinder 80 is controlled by a conventional air cylinder control 83.

The air cylinder 80 is the double-ended shaft type and includes a nonrotable, hollow, output shaft 88, extending completely through the body 81 of the air cylinder. The shaft 88 has a front end and a rear end and extends in coaxial alignment with the end stop member 15 and the electrode seal housing 69. The rear end of the output shaft 88 includes a hollow tubular stud 90 threadably mounted therein and movable with the cylinder shaft 88 as it moves in either direction in the air cylinder 80 (FIGS. 2 and 7). The tubular stud extends outward beyond the rear portion of the air cylinder 80 and extends through the fixed frame plate 54 as illustrated in FIGS. 2 and 3. A first rear stop member 92 is threadably mounted on the rear portion of the tubular stud 90 on the rear side of the fixed frame plate 54 opposite the air cylinder 80. A second forward stop member 94 is threadably mounted on the tubular stud 90 and positioned between the air cylinder 80 and the fixed frame plate 54.

Electrode holding shaft means in the form of a hollow elongate shaft 96 extends through the hollow air cylinder output shaft 88 and tubular stud 90 (FIGS. 2 and 7). The forward end includes a block clamp 98 to which the rear end of the electrode is connected and fixed thereto by a set screw 100. The block clamp 98 includes a threaded boss extension 102 threadably received in the front end of the air cylinder output shaft 88. A motor 104 is releasably connected to the rear end of the electrode holding shaft 96. The motor 104 has an output shaft (not shown in detail) releasably coupled to the rear end of the electrode holding shaft 96. The motor 104 includes respective forward and rear guide plates 106, 108 fixed thereto and mounted on the guide rails 50 for allowing longitudinal movement of the motor. The forward guide plate 106 rests on the guide rails 50. The rear guide plate 108 includes a latch 110 which allows the motor to be swung outward away from the guide rails when the electrode holding shaft 96 is disconnected therefrom. Springs 112 are positioned between the motor rear guide plate 108 and the rear flange support member 52 to maintain a forward biasing pressure against the motor. A programmable controller indicated generally at 114 controls the motor revolution (FIG. 1).

Before operation, the various limits and stops in the welding apparatus are adjusted to ensure: 1) the end stop member 15 will extend outward beyond the opening of the head 57 for engaging the sealing plug 12 during girth welding and will be retracted within the opening during seal welding and 2) the forward arc discharge tip of the seal welding electrode 14 will be retracted in the end stop 15 during girth welding and will be extended outward beyond the head 57 during seal welding. To ensure proper positioning of these components during girth and seal welding, the stop limiter 62 first is rotated on the head 57 to a desired position, where as the air cylinder 80 is moved forward to its limit, i.e. where the electrode seal housing 69 engages the stop limiter 62, the forward sealing plug engaging end of the end stop member 15 is extended outward beyond the opening 59 of the head 57 in a predetermined position for engaging and supporting the sealing plug of a nuclear fuel rod for girth welding. Additionally, the second forward stop member 94 on the tubular stud 90 is rotated on the stud so that when the air cylinder output shaft is retracted rearward, the stop engages the fixed frame plate 54 forcing the air cylinder and electrode seal housing 69 forward to engage the stop limiter (FIG. 2).

During seal welding the air cylinder output shaft 88 is moved forward to move the seal welding electrode 14 to a seal welding position (FIG. 3). At the same time, the air cylinder 80 must be moved rearward on the guide rails 50 to move the electrode seal housing 69 and end stop member 15 rearward. The first rear stop member 92 is adjusted on the tubular stud 90 so that as the air cylinder output shaft is moved forward, the first stop member 92 engages the fixed frame plate 54 and prevents further movement of the output shaft. The air cylinder 80 then moves rearward in response to the engagement of the first stop member 92 with the fixed frame plate 54 thus retracting the end stop member 15 into the bore 59 of the head 57. At this time, the arc discharge tip of the seal welding electrode 14 is positioned outward beyond the head 57 for seal welding. The controller 114 is programmed to rotate the motor 104 and electrode clamp shaft 96 connected thereto a predetermined amount before seal welding to move the electrode into contact with a sealing plug 12. When contact is made between the electrode 14 and sealing plug 12, the motor 104 automatically reverses itself a predetermined amount which moves the electrode holding shaft 96 rearward and positions the arc discharge tip of the seal welding electrode 14 in a predetermined position for seal welding.

METHOD OF OPERATION

During operation, a fuel rod 13 is inserted into the welding chamber 11 for girth welding. At this time, the air cylinder output shaft 88 is in its most rearward position and the arc discharge tip of the seal welding electrode 14 is positioned within the passage 66 of the end stop member 15. It is believed that positioning the electrode tip 0.75 inch (1.90 cm) within the end stop passage 66 is sufficient for preventing oxidation of the seal welding electrode 14 during evacuation of the fuel rod during girth welding. During movement of the output shaft 88 to its more rearward position, the second stop member 94 engages the fixed frame plate 54 and prevents further rearward movement of the output shaft. At this time, the air cylinder 80 is forced forward and moves the end stop member 15 forward to position the sealing plug engaging end of the end stop member 15 in its extended position outward beyond the opening 59 of the main housing body 57. The end stop member 15 engages the sealing plug which is moved into engagement therewith as illustrated in FIG. 1. At this time, girth welding occurs and hot gases produced during girth welding are drawn by vacuum through the end stop member axial passage 66, through the radially extending gas passageway 68 in the end stop, and into the housing body passageway 60 connecting thereto (FIG. 1). Because the arc discharge tip of the electrode is positioned about 0.75 inch rearward in the end stop member axial passage 66, the withdrawn hot gases produced during girth welding are believed to be sufficiently cool and will not adversely erode the seal welding electrode.

After girth welding, the air cylinder output shaft 88 is moved forward to position the arc discharge tip of the seal welding electrode 14 in an extended welding position. As the output shaft 88 and electrode 14 are moved forward the first stop member 92 engages the fixed frame plate 54 and as a result, further forward movement of the air cylinder output shaft is prevented. The air cylinder 80 is displaced rearward on the guide rails 50 thus retracting the end stop member 15 in the main housing body 57. The motor 104 rotates the electrode holding shaft 96 threadably received in the forward end of the output shaft 88 and moves the electrode 14 forward to contact the sealing plug. When the electrode contacts the sealing plug, the motor 104 through means of the controller 114 automatically reverses itself a predetermined amount and moves the electrode holding shaft and electrode rearward approximately 0.001 to 0.005 inch (0.003 to 0.013 cm) depending on the welding gap desired between the sealing plug 12 and the arc discharge tip of the seal welding electrode 14. During movement of the air cylinder output shaft 88 and air cylinder 80, the motor 104 also moves on the guide rails.

When welding is completed, these steps can be repeated. After numerous girth and seal welds, the seal welding electrode 14 may have to be replaced. This is facilitated by the construction of the illustrated embodiment where the motor 104 can be pivoted from the guide rails 50. The set screw 100 on the block clamp 98 is loosened and the seal welding electrode 14 moved through the hollow electrode holding shaft 96.

The present invention offers several benefits over other prior art seal welding apparatus and end stops. During girth welding, the seal welding electrode is retracted into the end stop member limiting the amount of decomposition occurring to the tip of the seal welding electrode resulting from hot gases being drawn over the seal welding electrode. In other prior art apparatus, the seal welding electrode is not withdrawn and remains in an extended position where the hot gases drawn from the sealing plug immediately engage the electrode and decompose same. Additionally, during seal welding, the end stop member is retracted, thus preventing the heat generated during seal welding from damaging the end stop member.

The foregoing embodiment is to be considered illustrative, rather than restrictive of the invention, and the modifications which come within the meaning of range of equivalents of the claims to be included therein.

I claim:

1. A welding apparatus for seal welding the bore of a sealing plug which is positioned adjacent the end of a hollow tube and where the bore is positioned adjacent and in communication with the tube, comprising a head, end stop means having a front sealing plug engaging end and a rear end, an axial passage extending through said end stop means and forming a front opening in said front end, said end stop means being rotatably mounted to said head and being movable between an extended position where said front sealing plug engaging end is extended outward beyond said head for engaging and supporting a sealing plug during girth welding, and a retracted position where said end stop means is retracted and said front sealing plug engaging end is positioned rearward of said extended position, a seal welding electrode having a forward arc discharge tip, said welding electrode extending through said axial passage, and being moveable therein between a retracted non-welding position where said tip is positioned within the axial passage and an extended welding position where said tip extends outward beyond said front opening of said end stop means for permitting the seal welding of the axial bore of a sealing plug, and drive means interconnected to said seal welding electrode and said end stop means for moving said end stop means to a retracted position while displacing said seal welding electrode to said extended seal welding position and for moving said end stop means to an extended position while displacing said seal welding electrode to said retracted non-welding position.

2. The apparatus as claimed in claim 1 wherein said front opening of said end stop means configured to engage the end of a fuel rod sealing plug and so that the axial bore of the sealing plug communicates with the axial passage of said end stop means.

3. The apparatus as claimed in claim 1 wherein said head includes an axial opening extending through said head, said end stop means being rotatably mounted within said opening.

4. The apparatus as claimed in claim 3 wherein said end stop means extends through said axial opening of said head and includes means for engaging a rear portion of said head for limiting forward, axial movement of said end stop means.

5. The apparatus as claimed in claim 1 wherein said drive means for moving said end stop member and said seal welding electrode includes a drive cylinder having a cylinder body and an output shaft with a forward end connected to said seal welding electrode and means interconnecting said cylinder body to the rear portion of said end stop means.

6. The apparatus as claimed in claim 5 wherein said output shaft is hollow and extends through said cylinder body to form a double ended shaft with forward and rear ends, electrode holding shaft means threadably mounted within said output shaft and being releasably connected to said seal welding electrode and means operatively connected to said electrode holding shaft means for rotating said electrode holding shaft means in said output shaft for moving said electrode holding shaft means relative to said cylinder output shaft.

7. The apparatus as claimed in claim 6 wherein said means operatively connected to said electrode holding shaft means is a drive motor and including programmable control means operatively connected to said drive motor for controlling the number of rotations of said electrode holding shaft means within said cylinder output shaft for advancing and retracting said seal welding electrode a predetermined distance relative to said output shaft.

8. The apparatus as claimed in claim 6 wherein said electrode holding shaft means is hollow for permitting said seal welding electrode to be passed therethrough for facilitating removal and replacement of said seal welding electrode.

9. The apparatus as claimed in claim 1 including a frame defining forward and rear ends, said head being fixed to the forward end of said frame.

10. A welding apparatus for seal welding the bore of a sealing plug which is positioned adjacent the end of a hollow tube and where the bore is in communication with the tube comprising a frame defining forward and rear ends, and including a pair of substantially parallel guide rails extending longitudinally from the forward to the rear a head fixed to the front end of said frame, between said guide rails, said head having front and rear portions and an axial opening extending through said head, end stop means having a front sealing plug engaging end and a rear end and an axial passage extending through said end stop means and forming a front opening, said end stop means being rotatably mounted in said head opening and being movable there within between an extended position where said front sealing plug engaging end extends outward beyond said opening for engaging and supporting a sealing plug during girth welding and a retracted position where said sealing plug engaging end is retracted within said bore, a drive cylinder mounted to said guide rails for longitudinal movement there along and means connecting said drive cylinder to said end stop means, said drive cylinder having an output shaft with front and rear ends, and wherein said shaft extends through said drive cylinder in substantially coaxial alignment with said end stop means passage, a seal welding electrode having a forward arc discharge tip and a rear end connected to the front end of said drive cylinder shaft, said seal welding electrode extending coaxially in said end stop means passageway and being movable therein upon actuation of said air cylinder output shaft between a retracted non-welding position where said tip is positioned within the axial passage and an extended welding position where said tip extends outward beyond said front opening of said end stop means for permitting the seal welding closure of the axial bore of a fuel rod sealing plug, and stop means for limiting movement of said cylinder output shaft in both a forward and reverse direction while generating a displacing movement of said drive cylinder in a reverse direction from the direction of movement of said output shaft wherein as said seal welding electrode is extended, said end stop means is retracted and as said seal welding electrode is retracted, said end stop means is extended.

11. The apparatus as claimed in claim 10 wherein said stop means includes a fixed plate extending transverse to said guide rails with the rear end of said cylinder output shaft extending through said plate, a first stop member mounted to the rear end of said output shaft for engaging said plate when said output shaft is moved forward, and a second stop member mounted on said output shaft on the opposing side of said plate for engaging said plate when said output shaft is moved rearward.

12. The apparatus as claimed in claim 11 wherein the position of said stop members on said shaft are adjustable.

13. The apparatus as claimed in claim 10 including a bushing positioned on at least one guide bar for limiting rearward displacement of said drive cylinder.

14. The apparatus as claimed in claim 10 wherein said drive cylinder output shaft is hollow, and including electrode holding shaft means threadably received into said cylinder output shaft, said seal welding electrode being releasably connected thereto, and including means operatively connected to said electrode holding shaft means for drivingly rotating said electrode holding shaft means in said cylinder output shaft for moving said electrode holding shaft means relative to said cylinder output shaft.

15. The apparatus as claimed in claim 10 wherein the rear end of said end stop means includes an electrically conductive housing having an axial passage, means mounted on said housing for connection to a supply of electrical current, said seal welding electrode extending through said housing, and means for imparting pressure onto said seal welding electrode of sufficient pressure for ensuring contact of said seal welding electrode with said housing while allowing frictional sliding of said seal welding electrode therethrough whereby electrical current applied to said housing is transmitted to said seal welding electrode.

16. An apparatus for girth welding a sealing plug to the end of a hollow tube and for seal welding a sealing plug axial bore which is in communication with the tube, said welding apparatus comprising
a housing defining a closed welding chamber and an access opening at one end of said chamber to allow passage of a tube fitted with a sealing plug having an axial bore coaxially aligned and in communication with the tube, therethrough to a girth and seal welding position within said chamber,
a girth welding assembly supported by said housing and having a girth welding electrode with a leading arc discharge tip disposed in said chamber,
means supporting said girth welding assembly and girth welding electrode for movement of said arc discharge tip toward and away from the tube and sealing plug,
drive rotation means for operatively connecting to a tube for rotating a tube when positioned for welding, and
a seal welding assembly for seal welding closed the bore of the sealing plug after girth welding of the plug to the tube, said seal welding assembly including
(a) a head having front and rear portions and means mounting said head to said welding chamber, said front portion of said head being disposed in said welding chamber,
(b) end stop means having a front sealing plug engaging end and a rear end, an axial passage extending through said end stop means and forming a front opening, said end stop means being rotatively mounted to said head and being movable between an extended position where said front sealing plug engaging end is extended outward beyond said head front portion and into said welding chamber for engaging and supporting a sealing plug during girth welding, and a retracted position where said end stop body member is retracted and said front sealing plug engaging end is positioned rearward of said extended position,
(c) a seal welding electrode having arc discharge tip, said seal welding electrode extending through said end stop member passage, and being moveable there within between a retracted non-welding position where said tip is positioned within said passage and an extended seal welding position where said tip extends outward beyond said front opening of said end stop means for permitting the seal welding closure of the axial bore of a fuel rod sealing plug, and (d) drive means interconnected to said seal welding electrode and said end stop means for moving said end stop means to a retracted position while displacing said seal welding electrode to said extended seal welding position and for moving said end stop means to an extended position while displacing said seal welding electrode to said retracted non-welding position.

17. The apparatus as claimed in claim 16 wherein said front opening of said end stop means is configured to engage the end of a fuel rod sealing plug and so that the axial bore of the sealing plug communicates with the axial passage of said end stop means.

18. The apparatus as claimed in claim 16 wherein said head includes an axial opening, said end stop means being rotatably mounted within said opening.

19. The apparatus as claimed in claim 18 wherein said end stop means extends through said opening and includes means for engaging the rear portion of said head for limiting forward, axial movement of said end stop means.

20. The apparatus as claimed in claim 16 wherein said drive means for moving said end stop means and said seal welding electrode includes drive cylinder means having a drive cylinder body and an output shaft with a forward end connected to said seal welding electrode, means interconnecting said cylinder body to the rear portion of said end stop means.

21. The apparatus as claimed in claim 20 wherein said drive cylinder output shaft is hollow and extends through said cylinder body to form a double ended shaft with forward and rear ends, electrode holding shaft means threadably mounted within said output shaft, said seal welding electrode being releasably connected to said electrode holding shaft means, and means operatively connected to said electrode holding shaft means for drivingly rotating said electrode holding shaft means in said output shaft and for moving said electrode holding shaft means relative to said output shaft.

22. The apparatus as claimed in claim 21 wherein said means operatively connected to said electrode holding shaft means is a drive motor and including programmable control means operatively connected to said drive motor for controlling the number of rotations of said electrode holding shaft means within said drive cylinder output shaft for advancing and retracting said seal welding electrode a predetermined distance relative to said output shaft.

23. The apparatus as claimed in claim 21 wherein said electrode holding shaft means is hollow for permitting said seal welding electrode to be passed therethrough for facilitating removal and replacement of said seal welding electrode.

24. An apparatus for girth welding a sealing plug to the end of a hollow tube and for seal welding a sealing plug axial bore which is in communication with the tube, said welding apparatus comprising
a housing defining a closed welding chamber and an access opening at one end of said chamber to allow passage of a tube therethrough which is fitted with a sealing plug having an axial bore in communication with the tube, a girth welding assembly supported by said housing and having a girth welding electrode with a leading arc discharge tip disposed in said chamber, means supporting said girth welding assembly and girth welding electrode for movement of said electrode arc discharge tip toward and away from the hollow tube and sealing plug, drive rotation means for operatively connecting to a tube for rotating a tube when positioned for welding, and a seal welding assembly for seal welding the bore of the sealing plug after girth welding of the plug to the tube, said seal welding assembly including (a) a frame defining forward and rear ends, and including a pair of substantially parallel guide rails extending longitudinally from the forward to the rear end of said frame, (b) means mounting said frame to the said welding chamber housing, (c) a head fixed to the front end of said frame between said guide rails, said head having front and rear portions and an axial opening extending through said head, (d) end stop means having a front sealing plug engaging end and a rear end, and an axial passage extending through said end stop means and forming a front opening, said end stop means being rotatably mounted in said head opening and being movable there within between an extended position where said front sealing plug engaging end extends outward beyond said opening for engaging and supporting a sealing plug during girth welding and a retracted position where said sealing plug engaging end is retracted within said opening, a drive cylinder mounted to said guide rails for longitudinal movement there along and connected to said end stop means, said drive cylinder having an output shaft with front and rear ends, and wherein said output shaft extends through said air cylinder in substantially coaxial alignment with said end stop means passage, a seal welding electrode having a forward arc discharge tip and a rear end connected to the front end of said air cylinder output shaft, said seal welding electrode extending coaxially in said end stop means passageway and being movable therein upon actuation of said cylinder output shaft between a retracted non-welding position where said tip is positioned within the axial passageway and an extended welding position where said tip extends outward beyond said front opening of said end stop means for permitting the seal welding closure of the axial opening of a fuel rod sealing plug, and stop means for limiting movement of said output shaft in both a forward and reverse direction while generating movement of said drive cylinder in a reverse direction from the direction of movement of said output shaft whereby as said welding electrode means is extended, said end stop member is retracted, and as said welding electrode means is retracted, said end stop member is extended.

25. The apparatus claimed in claim 24 wherein said stop means includes a plate extending transverse to said guide rails and being fixedly connected thereto, the rear end of said output shaft extending through said plate, a first stop member mounted to the rear end of said output shaft for engaging said plate when said output shaft is moved forwardly, and a second stop member mounted on said output shaft on the opposing side of said plate for engaging said plate when said output shaft is moved rearwardly.

26. The apparatus as claimed in claim 24 wherein the position of said stop members on said shaft are adjustable.

27. The apparatus as claimed in claim 24 including a bushing positioned on at least one guide bar for limiting rearward displacement of said drive cylinder.

28. The apparatus as claimed in claim 24 wherein said drive cylinder output shaft is hollow, and including electrode holding shaft means threadably received into said drive cylinder output shaft, said seal welding electrode being releasably connected thereto, and including means operatively connected to said electrode holding shaft means for drivingly rotating said electrode holding shaft means in said output shaft for moving said electrode holding shaft means relative to said output shaft.

29. The apparatus as claimed in claim 24 wherein the rear end of said end stop means includes an electrically conductive housing having an axial passage, means mounted on said housing for connection to a supply of electrical current, said seal welding electrode extending through said head, and means for imparting pressure onto said seal welding electrode of sufficient pressure for ensuring contact of said seal welding electrode with said head while allowing frictional sliding of said seal welding electrode therethrough whereby electrical current applied to said head is transmitted to said seal welding electrode.

* * * * *